US012793553B2

(12) United States Patent
Sunaga et al.

(10) Patent No.: US 12,793,553 B2
(45) Date of Patent: Nov. 10, 2026

(54) NOTIFICATION CONTROL APPARATUS AND NOTIFICATION CONTROL METHOD FOR VEHICLES

(71) Applicant: JVCKENWOOD Corporation, Yokohama (JP)

(72) Inventors: Ryohei Sunaga, Yokohama (JP); Takuji Teruuchi, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 9 days.

(21) Appl. No.: 19/004,529

(22) Filed: Dec. 30, 2024

(65) Prior Publication Data

US 2025/0140119 A1 May 1, 2025

Related U.S. Application Data

(63) Continuation of application No. PCT/JP2023/023650, filed on Jun. 26, 2023.

(30) Foreign Application Priority Data

Aug. 25, 2022 (JP) ................................ 2022-134084
Apr. 25, 2023 (JP) ................................ 2023-071209

(51) Int. Cl.
*G08G 1/16* (2006.01)
*G06V 20/58* (2022.01)

(52) U.S. Cl.
CPC ............. *G08G 1/166* (2013.01); *G06V 20/58* (2022.01)

(58) Field of Classification Search
CPC .......... G08G 1/166; G08G 1/16; G06V 20/58; G06V 40/103; G06V 40/18
See application file for complete search history.

(56) References Cited

U.S. PATENT DOCUMENTS

| | | | | |
|---|---|---|---|---|
| 10,272,830 | B2 * | 4/2019 | Suzuki | B60Q 1/04 |
| 10,300,846 | B2 * | 5/2019 | Suzuki | B60Q 1/50 |
| 10,328,847 | B2 * | 6/2019 | Yang | B60Q 1/543 |
| 10,358,083 | B2 * | 7/2019 | Suzuki | B60Q 1/04 |
| 10,943,472 | B2 * | 3/2021 | Morimura | B60Q 1/503 |
| 11,345,276 | B2 * | 5/2022 | Kareem | B60Q 1/486 |
| 12,330,554 | B2 * | 6/2025 | Mouri | B60Q 1/50 |
| 2020/0223352 | A1 * | 7/2020 | Toshio Kimura | B60Q 1/5037 |
| 2020/0410294 | A1 * | 12/2020 | Groh | G06F 18/211 |

FOREIGN PATENT DOCUMENTS

| | | | | |
|---|---|---|---|---|
| CN | 104933893 B * | 4/2019 | | G08G 1/166 |
| JP | 2005332297 A | 12/2005 | | |
| JP | 2019179375 A | 10/2019 | | |

OTHER PUBLICATIONS

CN104933893B and translation (Year: 2019).*
International Preliminary Examination Report on Patentability (I) for the corresponding PCT Application No. PCT/JP2023/023650 mailed Feb. 25, 2025, 9 pages.
International Search Report for the corresponding PCT Application No. PCT/JP2023/023650 mailed Sep. 5, 2023, 4 pages.

* cited by examiner

*Primary Examiner* — Frederick M Brushaber
(74) *Attorney, Agent, or Firm* — Shih IP Law Group, PLLC

(57) ABSTRACT

A notification control apparatus detects, based on an image capturing a scene outside a vehicle, a person in a vicinity of the vehicle. The notification control apparatus detects a behavior of the person detected. The notification control apparatus outputs, when it is determined based on the behavior of the person detected that it is necessary to notify the person from the vehicle, a notification to the person.

11 Claims, 7 Drawing Sheets

FIG. 3

| AGE/ARTICLE ACCOMPANYING PERSON | GAZE AT VEHICLE | SOUND TYPE | SOUND VOLUME | COLOR OF CLOTHES | DETAIL OF CALL DIRECTED TO PERSON DETECTED TO PASS |
|---|---|---|---|---|---|
| ADULT | YES | NORMAL | SMALL | RED | ATTENTION. THE INDIVIDUAL IN RED CLOTHES THERE, PLEASE CROSS THE ROAD. |
| | NO | | MEDIUM | | ATTENTION. THIS IS AN AUTOMATICALLY DRIVEN CAR. THE INDIVIDUAL IN RED CLOTHES THERE, DO YOU WANT TO CROSS THE ROAD? |
| AGED PERSON | YES | NORMAL | MEDIUM | BROWN | ATTENTION. THE INDIVIDUAL IN BROWN CLOTHES THERE, PLEASE CROSS THE ROAD. |
| | NO | | LARGE | | ATTENTION. THIS IS AN AUTOMATICALLY DRIVEN CAR. THE INDIVIDUAL IN BROWN CLOTHES THERE, DO YOU WANT TO CROSS THE ROAD? |
| CHILD | YES | SOUND FOR CHILDREN | SMALL | YELLOW | ATTENTION. THE BOY/GIRL IN YELLOW CLOTHES THERE, PLEASE CROSS THE ROAD CAREFULLY. |
| | NO | | MEDIUM | | ATTENTION. I AM AN AUTOMATICALLY DRIVEN CAR. THE BOY/GIRL IN YELLOW CLOTHES THERE, DO YOU WANT TO CROSS THE ROAD? |
| HEADPHONE | YES | NORMAL | LARGE | BLACK | ATTENTION. THE INDIVIDUAL IN BLACK CLOTHES THERE WEARING A HEADPHONE, PLEASE CROSS THE ROAD. |
| | NO | | VERY LARGE | | ATTENTION. THIS IS AN AUTOMATICALLY DRIVEN CAR. THE INDIVIDUAL IN BLACK CLOTHES THERE WEARING A HEADPHONE, DO YOU WANT TO CROSS THE ROAD? |
| BICYCLE | YES | NORMAL | LARGE | WHITE | ATTENTION. THE INDIVIDUAL IN WHITE CLOTHES THERE RIDING A BICYCLE, PLEASE CROSS THE ROAD. |
| | NO | | VERY LARGE | | ATTENTION. THIS IS AN AUTOMATICALLY DRIVEN CAR. THE INDIVIDUAL IN WHITE CLOTHES THERE RIDING A BICYCLE, DO YOU WANT TO CROSS THE ROAD? |

FIG. 6

| AGE/ARTICLE ACCOMPANYING PERSON | GAZE AT VEHICLE | SOUND TYPE | SOUND VOLUME | COLOR OF CLOTHES | DETAIL OF CALL DIRECTED TO PERSON MOVING ALONG VEHICLE |
|---|---|---|---|---|---|
| ADULT | YES | NORMAL | SMALL | RED | ATTENTION. THE INDIVIDUAL IN RED CLOTHES THERE, AN AUTOMATICALLY DRIVEN CAR IS PASSING ON YOUR RIGHT SIDE. |
| | NO | | MEDIUM | | ATTENTION. THE INDIVIDUAL IN RED CLOTHES THERE, PLEASE BE CAREFUL OF AN AUTOMATICALLY DRIVEN CAR APPROACHING AND PASSING ON YOUR RIGHT SIDE. |
| AGED PERSON | YES | NORMAL | MEDIUM | BROWN | ATTENTION. THE INDIVIDUAL IN BROWN CLOTHES THERE, AN AUTOMATICALLY DRIVEN CAR IS PASSING ON YOUR RIGHT SIDE. |
| | NO | | LARGE | | ATTENTION. THE INDIVIDUAL IN BROWN CLOTHES THERE, PLEASE BE CAREFUL OF AN AUTOMATICALLY DRIVEN CAR APPROACHING AND PASSING ON YOUR RIGHT SIDE. |
| CHILD | YES | SOUND FOR CHILDREN | SMALL | YELLOW | ATTENTION. THE BOY/GIRL IN YELLOW CLOTHES THERE, PLEASE BE CAREFUL AS I AM PASSING BY YOU. |
| | NO | | MEDIUM | | ATTENTION. THE BOY/GIRL IN YELLOW CLOTHES THERE, PLEASE BE CAREFUL OF AN AUTOMATICALLY DRIVEN CAR APPROACHING AND PASSING BY YOU. |
| HEADPHONE | YES | NORMAL | LARGE | BLACK | ATTENTION. THE INDIVIDUAL IN BLACK CLOTHES THERE WEARING A HEADPHONE, AN AUTOMATICALLY DRIVEN CAR IS PASSING ON YOUR RIGHT SIDE. |
| | NO | | VERY LARGE | | ATTENTION. THE INDIVIDUAL IN BLACK CLOTHES THERE WEARING A HEADPHONE, PLEASE BE CAREFUL OF AN AUTOMATICALLY DRIVEN CAR APPROACHING AND PASSING ON YOUR RIGHT SIDE. |
| BICYCLE | YES | NORMAL | LARGE | WHITE | ATTENTION. THE INDIVIDUAL IN WHITE CLOTHES THERE RIDING A BICYCLE, AN AUTOMATICALLY DRIVEN CAR IS PASSING ON YOUR RIGHT SIDE. |
| | NO | | VERY LARGE | | ATTENTION. THE INDIVIDUAL IN WHITE CLOTHES THERE RIDING A BICYCLE, PLEASE BE CAREFUL OF AN AUTOMATICALLY DRIVEN CAR APPROACHING AND PASSING ON YOUR RIGHT SIDE. |

NOTIFICATION CONTROL APPARATUS AND NOTIFICATION CONTROL METHOD FOR VEHICLES

CROSS REFERENCE TO RELATED APPLICATION

This application is a Continuation of International Application No. PCT/JP2023/023650, filed on Jun. 26, 2023, which in turn claims the benefit of both Japanese Application No. 2022-134084, filed on Aug. 25, 2022 and Japanese Application No. 2023-071209, filed on Apr. 25, 2023, the disclosures of which Application is incorporated by reference herein.

BACKGROUND

1. Field

The present disclosure relates to a notification control apparatus and a notification control method for vehicles.

2. Description of the Related Art

In Patent Literature 1 mentioned below, an apparatus for communicating with a person outside a vehicle by displaying a gesture image to a person located outside the vehicle is proposed.

[Patent Literature 1] JP2019-179375

SUMMARY

The present disclosure addresses the issue described above, and a purpose thereof is to provide a technology that supports a vehicle so that it can communicate suitably with a person located in the vicinity of the vehicle.

A notification control apparatus for a vehicle according to an embodiment of the present disclosure includes: a person detection unit that detects, based on an image capturing a scene outside a vehicle, a person in a vicinity of the vehicle; a behavior detection unit that detects a behavior of the person detected by the person detection unit; and a notification control unit that outputs, when it is determined based on the behavior of the person detected by the behavior detection unit that it is necessary to notify the person from the vehicle, a notification to the person.

Another embodiment of the present disclosure relates to a notification control method. The method is executable by a computer and includes: detecting, based on an image capturing a scene outside a vehicle, a person in a vicinity of the vehicle; detecting a behavior of the person detected in the detecting; and outputting, when it is determined based on the behavior of the person detected by the detecting of a behavior that it is necessary to notify the person from the vehicle, a notification to the person.

Optional combinations of the aforementioned constituting elements, and implementations of the present disclosure in the form of systems, vehicles, computer programs, and recording mediums recording computer programs may also be practiced as additional modes of the present disclosure.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 3 shows an example of the call rule in the first embodiment;

FIG. 6 shows an example of the call rule in the second embodiment; and

DETAILED DESCRIPTION

The invention will now be described by reference to the preferred embodiments. This does not intend to limit the scope of the present invention, but to exemplify the invention.

An overview of embodiments according to the present disclosure will be described. When a vehicle that runs autonomously with an automatic driving function (hereinafter also referred to as an "automatically driven vehicle"), runs on the side of a pedestrian, it may cause anxiety in the pedestrian because he or she cannot know whether the automatically driven vehicle recognizes him or her. The automatically driven vehicle of the embodiments outputs, to a pedestrian recognized to be around the vehicle, a call including information that covers the characteristic of the person. This causes the pedestrian around the automatically driven vehicle to be aware that the automatically driven vehicle recognizes him or her and is attempting to communicate with him or her so that he or she can pass near the automatically driven vehicle with peace of mind.

The vehicle in which the notification control apparatus for vehicles according to the present disclosure is used is assumed to be an automatically driven vehicle, but the present disclosure is also applicable to a vehicle driven manually by a person. The present disclosure can also be applied to moving objects other than vehicles such as robots. The pedestrians of the embodiments broadly encompasses persons passing on a road, including, for example, persons riding a bicycle. Further, the call according to the embodiment shall be a call using sound (in other words, auditory information) but may be a call using visual information such as display of an image.

First Embodiment

Figure 1:
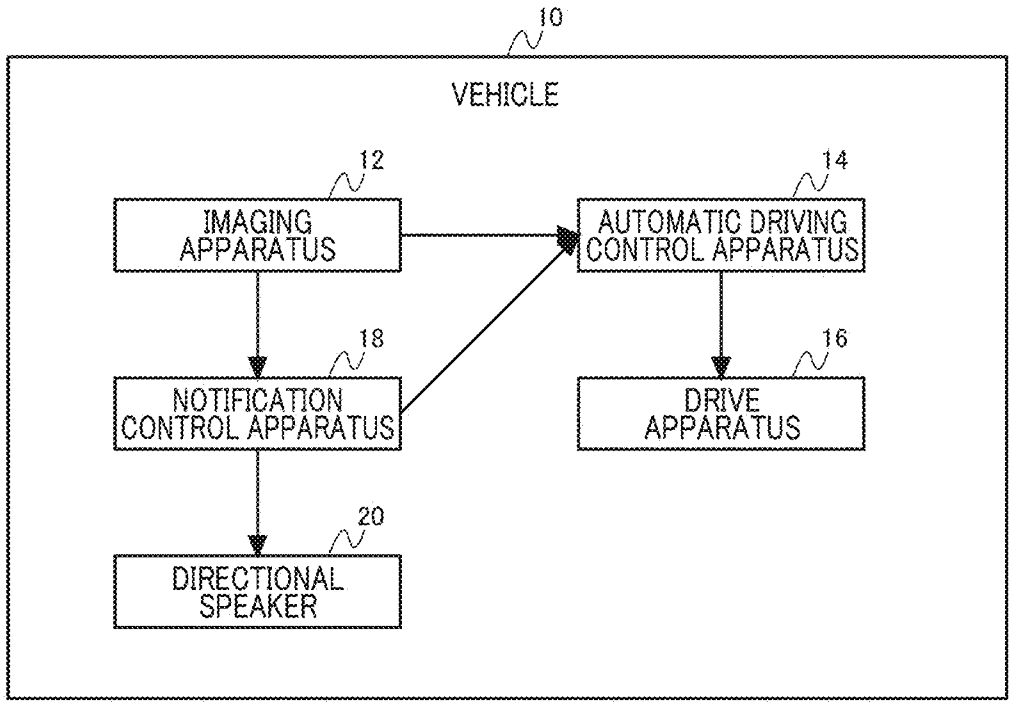
FIG. 1 shows a configuration of a vehicle of the first embodiment.

In the first embodiment, a technology for calling out to a pedestrian attempting to cross on the route of an automatically driven vehicle is proposed. FIG. 1 shows a configuration of a vehicle 10 of the first embodiment and mainly shows the hardware configuration mounted on the vehicle 10. The vehicle 10 is an automatically driven vehicle and includes an imaging apparatus 12, an automatic driving control apparatus 14, a driving apparatus 16, a notification control apparatus 18, and a directional speaker 20.

The imaging apparatus 12 includes a camera and images the space around the vehicle 10. The imaging apparatus 12 outputs an image capturing the space around the vehicle 10 to the automatic driving control apparatus 14 and the notification control apparatus 18. The captured image shows a person (e.g., a person walking on a sidewalk, a person riding a bicycle, etc.) located in the vicinity of the vehicle 10. The captured image comprises moving images (i.e., a video).

The driving apparatus 16 is an apparatus for causing the vehicle 10 to run and includes, for example, a powertrain, a steering, a brake, etc.

The automatic driving control apparatus 14 creates a driving plan (including a planned route) for the vehicle 10 based on information such as a destination set by the driver. The automatic driving control apparatus 14 controls the automatic driving of the vehicle 10 based on the driving plan of the vehicle 10. For example, the automatic driving control apparatus 14 controls the driving apparatus 16 to cause the vehicle to run on the planned route indicated by the driving plan, based on the captured image output from the imaging apparatus 12, the position of the driver's vehicle detected by the positioning apparatus (not shown), etc. The automatic driving control apparatus 14 may control the running of the vehicle 10 by also taking into account the detection result of the notification control apparatus 18 regarding a person around the vehicle 10.

The directional speaker 20 is a speaker that delivers sound only to a specific area. The notification control apparatus 18 controls the audio output from the directional speaker 20 and controls the call so that the output sound is directed at the person located in the vicinity of the vehicle 10.

Each of the automatic driving control apparatus 14 and the notification control apparatus 18 may be implemented as a microcontroller or implemented as an ECU (Electronic Control UnitIt. Further, the automatic driving control apparatus 14 and the notification control apparatus 18 may constitute a vehicle processing system that is a data processing system in the vehicle 10.

Figure 2:
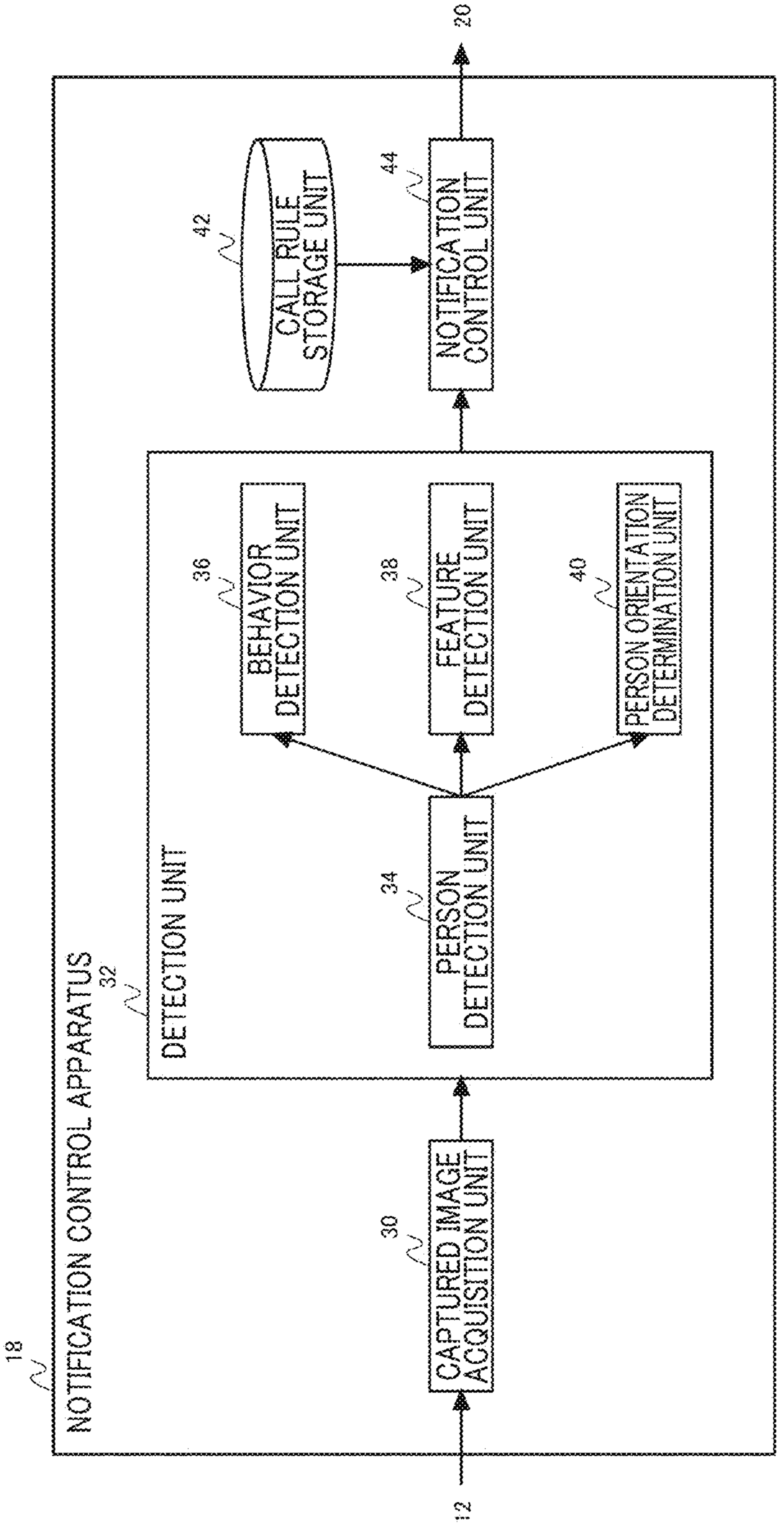
FIG. 2 is a block diagram showing functional blocks included in the notification control apparatus of FIG. 1.

FIG. 2 is a block diagram showing functional blocks included in the notification control apparatus 18 of FIG. 1. The blocks depicted in the block diagrams of this specification are implemented in hardware by devices/electronic circuits/mechanical apparatuses exemplified by a processor, a CPU, and a memory of a computer, and in software by a computer program, etc. FIG. 2 depicts functional blocks implemented by the cooperation of these elements. Therefore, it will be understood by those skilled in the art that the functional blocks may be implemented in a variety of manners by a combination of hardware and software.

The notification control apparatus 18 includes a captured image acquisition unit 30, a detection unit 32, a call rule storage unit 42, and a notification control unit 44. The functions of at least some of the plurality of functional blocks included in the notification control apparatus 18 may be implemented in a computer program. This computer program may be installed in a storage of the notification control apparatus 18 via a recording medium or a network. The processor (CPU, etc.) of the notification control apparatus 18 may exhibit the functions of the plurality of functional blocks by reading this computer program into the main memory and executing the program.

The call rule storage unit 42 stores a rule related to a call directed at a pedestrian located in the vicinity of the vehicle 10 (hereinafter also referred to as "call rule"). FIG. 3 shows an example of the call rule in the first embodiment. The "age/article accompanying person" and "color of clothes" columns in FIG. 3 indicate examples of the characteristic of a detected person detected by the characteristic extraction unit 38. The "gaze at vehicle" column is for classification of whether the detected person is looking in the direction of the vehicle as determined by the person orientation determination unit 40, which is indicated by the presence or absence of gaze at the vehicle. The "sound type", "sound volume", and "detail of call" columns indicate the mode and detail of notification output by the notification control unit 44.

Referring back to FIG. 2, the captured image acquisition unit 30 acquires a captured image output from the imaging apparatus 12. The detection unit 32 detects information on a person shown in the captured image acquired by the captured image acquisition unit 30. The detection unit 32 includes a person detection unit 34, a behavior detection unit 36, a characteristic extraction unit 38, and a person orientation determination unit 40.

The person detection unit 34 detects a person located in the vicinity of the vehicle 10, i.e., a pedestrian, by analyzing the captured image acquired by the captured image acquisition unit 30. The vicinity of the vehicle 10 can be said to be a space around the vehicle 10 and can also be said to be an area along the direction of travel (planned route) of the vehicle 10. The pedestrian detected by the person detection unit 34 will be described hereinafter as the "detected person".

The behavior detection unit 36 detects the behavior of the detected person detected by the person detection unit 34. The behavior detection unit 36 detects the behavior of the detected person by analyzing the transition of the position of the detected person in the captured image, etc. The behavior of the detected person in this case is the movement of the detected person. The behavior detection unit 36 may estimate the future behavior of the detected person by analyzing the captured image. The behavior detection unit 36 determines whether a behavior that requires notification from the vehicle 10 to the detected person is detected. Specifically, the behavior detection unit 36 determines whether the detected person is likely to head in the direction of travel of the vehicle 10. In the first embodiment, it is determined whether the detected person is likely to cross the planned route of the vehicle 10.

The characteristic extraction unit 38 extracts the characteristic of the detected person detected by the person detection unit 34. The characteristic extraction unit 38 extracts the characteristic of the detected person by analyzing the range where the detected person is detected or the surrounding of the detected person in the captured image. The characteristic of the detected person includes, for example, (1) information on the shape, pattern or color of the clothes worn by the detected person, (2) information on the gear or device (e.g., a headphone, a hat, etc.) worn by the detected person, and (3) the gear or device used by the detected person for passage (e.g., a bicycle, cart, etc.).

When it is detected that there are a plurality of detected persons having similar appearances (having similar characteristics) around the vehicle 10, the characteristic extraction unit 38 may extract characteristics that can identify individual call targets, based on the captured image. When there are a plurality of persons wearing a hat around the vehicle 10, for example, the shape, pattern, and color of the hat may be further detected instead of simply detecting a hat as the characteristic of the detected person. The call rule may define a detail of call like "the individual wearing a red hat" or "the individual wearing a black hat" instead of simply defining "the individual wearing a hat".

When it is determined that it is necessary to notify the detected person from the vehicle 10 based on the behavior of the detected person detected by the behavior detection unit 36, the notification control unit 44 outputs a notification for the detected person to the detected person. When the behavior detection unit 36 detects that the detected person is likely to head in the direction of travel of the vehicle 10, the notification control unit 44 determines that it is necessary to notify the detected person from the vehicle 10.

In the first embodiment, the notification control unit 44 controls the directional speaker 20 according to the call rules stored in the call rule storage unit 42 and outputs a notification sound to the detected person. When it is determined by the behavior detection unit 36 that the detected person is likely to head in the direction of travel of the vehicle 10, for example, the notification control unit 44 determines that it is necessary to notify the detected person from the vehicle 10 and outputs a notification, including the characteristic of the detected person extracted by the characteristic extraction unit 38, to the detected person. Further, when the behavior detection unit 36 detects that the detected person is stationary and is likely to head in the direction of travel of the vehicle 10, the notification control unit 44 determines that it is necessary to notify the detected person from the vehicle 10 and outputs a notification, including the characteristic of the detected person, to the detected person.

The detected person heading in the direction of travel of the vehicle 10 encompasses the detected person crossing the planned route of the vehicle 10 and encompasses the detected person moving along the planned route of the vehicle 10 (i.e., the vehicle 10 and the detected person moving along). The first embodiment will describe the former case, and the second embodiment described later will describe the latter case.

The person orientation determination unit 40 detects the face orientation or gaze direction of the detected person detected by the person detection unit 34. In the first embodiment, the person orientation determination unit 40 determines whether the face orientation or gaze direction of the detected person is aligned with the direction of the vehicle 10.

The notification control unit 44 outputs different notifications to the detected person when it is determined by the person orientation determination unit 40 that the face orientation or gaze direction of the detected person is aligned with the direction of the vehicle 10 and when the face orientation or gaze direction of the detected person is not aligned with the direction of the vehicle 10. Thus, it is possible to output a proper notification suited to the state of the detected person by switching the detail of notification to the detected person according to whether the face orientation or gaze direction of the detected person is determined to be aligned with the direction of the vehicle 10 or the face orientation or gaze direction of the detected person is not aligned with the direction of the vehicle 10.

In the first embodiment, the notification control unit 44 outputs a notification that uses an expression indicating a request to the detected person when the face orientation or gaze direction of the detected person is aligned with the direction of the vehicle 10. When the face orientation or gaze direction of the detected person is not aligned with the direction of the vehicle 10, on the other hand, the notification control unit 44 outputs a notification that uses an expression indicating an inquiry to the detected person.

The expression indicating a request to the detected person is, for example, an expression "Please cross the road" directed at a person standing on the side of the road while looking at the vehicle 10. An expression indicating a request to the detected person can be said to be an expression that prompts the detected person to make an action. This is because the detected person looking at the vehicle 10 is relatively more likely to move in the direction of travel of the vehicle 10, and so it is appropriate to let the detected person pass first from the viewpoint of preventing a traffic accident. On the other hand, the expression indicating an inquiry to the detected person is, for example, an expression "Do you want to cross the road?" directed at a person standing on the side of the road without looking at the vehicle 10. Since it is difficult to predict the next behavior of a detected person not looking at the vehicle 10, it is possible to check a reaction of the detected person by making an inquiry to the detected person.

The processes of the person detection unit 34, the behavior detection unit 36, the characteristic extraction unit 38, and the person orientation determination unit 40 may be implemented by a known technology. For example, at least some of the processes of the person detection unit 34, the behavior detection unit 36, the characteristic extraction unit 38, and the person orientation determination unit 40 may be implemented by using a machine learning model. This machine learning model may be a mathematical model (neural network, decision tree, etc.) created by machine learning that uses images (face images, etc.) reflecting the appearance and behavior of a large number of pedestrians having various characteristics as learning data. Further, at least some of the processes of the person detection unit 34, the behavior detection unit 36, the characteristic extraction unit 38, and the person orientation determination unit 40 may be implemented by using the pedestrian detection technology described in JP 2005-228127.

Figure 4:
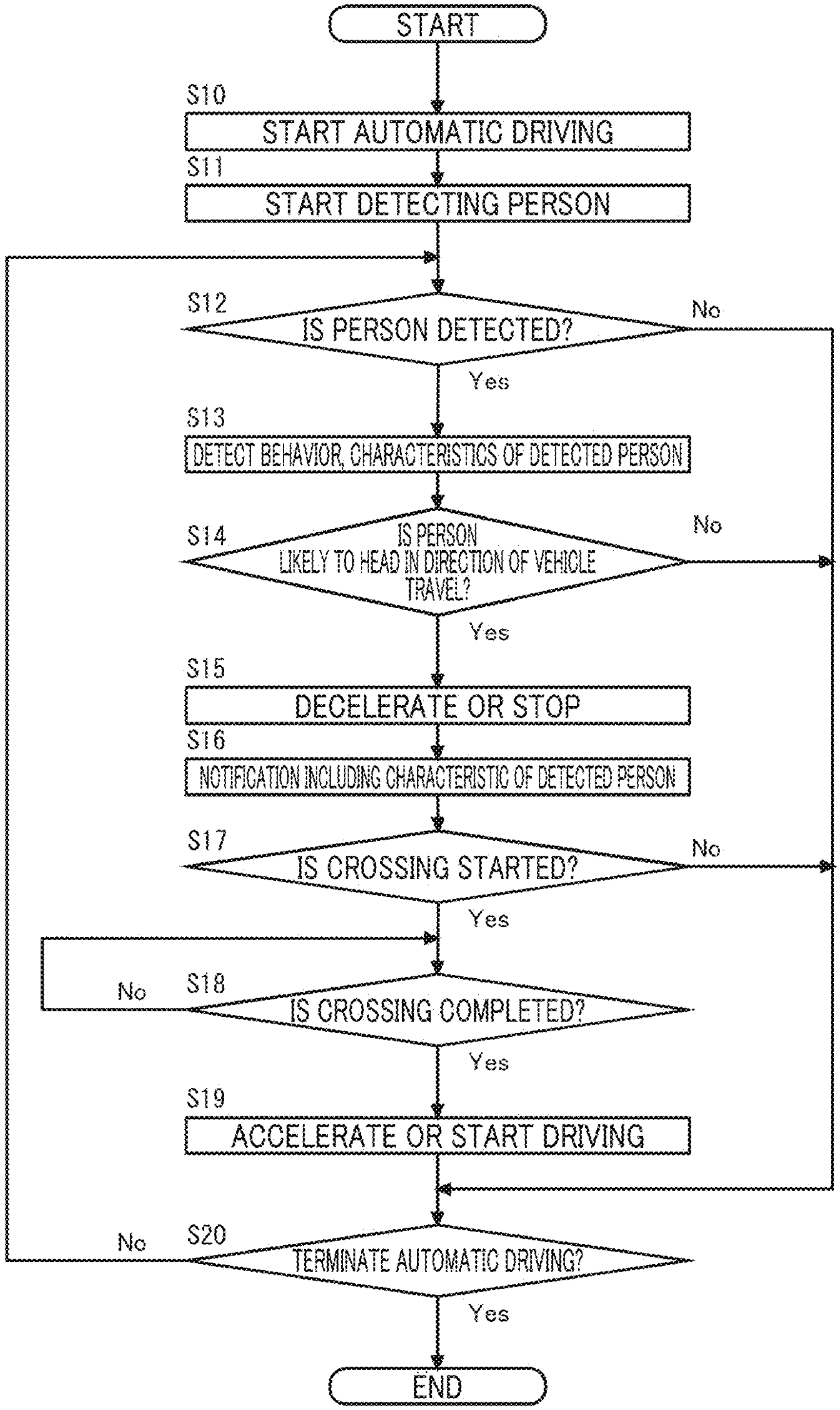
FIG. 4 is a flowchart showing an exemplary operation of the vehicle of the first embodiment.

The operation of the vehicle 10 having the above configuration will be described. FIG. 4 is a flowchart showing an exemplary operation of the vehicle 10 of the first embodiment. The process shown in FIG. 4 is an exemplary process that does not include the determination on the "gaze at vehicle" column in FIG. 3. In such a case, the notification control unit 44 does not make a distinction of the "sound volume" column but outputs a call having a detail selected in the "detail of call" column.

The automatic driving control apparatus 14 starts automatic driving of the vehicle 10 in response to the driver's start instruction (step S10). The captured image acquisition unit 30 of the notification control apparatus 18 acquires an image captured by the imaging apparatus 12. The detection unit 32 of the notification control apparatus 18 starts a process of recognizing a pedestrian around the vehicle 10 based on the captured image (step S11). The acquisition of the captured image and the pedestrian recognition process are repeatedly executed while the process of the figure is being executed.

In step S11, the process of recognizing a pedestrian around the vehicle 10 is started, which causes the person detection unit 34 of the notification control apparatus 18 to determine whether there is a pedestrian in the vicinity of the vehicle 10 (step S12). When it is determined in step S12 that a pedestrian has been detected (Yes in step S12), the process proceeds to step S13 to detect the behavior and characteristic of the detected person who is a detected pedestrian (step S13) and proceeds to step S14. The behavior detection unit 36 of the notification control apparatus 18 detects, as the behavior of the detected person detected in step S13, that the detected person is about to cross the planned route of the vehicle 10 based on the position and movement direction of the detected person as detected. The characteristic extraction unit 38 of the notification control apparatus 18 estimates, as the characteristic of the detected person detected in step S13, the age of the detected person and also detects an article accompanying the person (a headphone, a bicycle, etc.), the color of clothes, etc. When it is not determined in step S12 that a pedestrian is detected (No in step S12), the process proceeds to step S20.

In step S14, it is determined, based on the detection result in step S13, whether a behavior that requires notification from the vehicle 10 to the detected person is detected and, specifically, whether the detected person is likely to head toward the planned route that is the direction of travel of the vehicle 10. The determination in step S14 includes detecting a situation where a pedestrian is detected at a position close to the planned route and the direction of movement of the detected person who is the detected pedestrian is the direction of crossing the planned route. The determination in step S14 may also include detecting a situation where the detected person is stationary and is likely to head in the direction of crossing the planned route.

When it is determined in step S14 that the detected person is likely to head toward the planned route that is the direction of travel of the vehicle 10 (Yes in step S14), the process proceeds to step S15. When it is not determined in step S14 that the detected person is likely to head toward the planned route that is the direction of travel of the vehicle 10 (No in step S14), the process proceeds to step S20.

In step S15, the vehicle 10 is slowed down or stopped. Specifically, the automatic driving control apparatus 14 slows down or stops the vehicle 10 as necessary before a position where the detected person is likely to cross the planned route.

After the vehicle 10 slows down or stops in step S15, the notification control unit 44 of the notification control apparatus 18 refers to the call rule stored in the call rule storage unit 42 and identifies a call mode (sound type, sound volume, detail of call) associated with the characteristic (age, article accompanying the person, color of clothes) of the detected person detected by the characteristic extraction unit 38. The notification control unit 44 outputs a call sound of the specified mode from the directional speaker 20 to the detected person (step S16) and proceeds to step 17.

When the detected person is an adult wearing red clothes, for example, the notification control unit 44 may cause a call voice "Attention. The individual in red clothes there, please cross the road" to be output from the directional speaker 20 to the person. Alternatively, when the detected person is a person wearing white clothes and riding a bicycle, the notification control unit 44 may output a call sound "Attention. This is an automatically driven car. The individual in white clothes there riding a bicycle, do you want to cross the road?" from the directional speaker 20 toward the person.

In step S17, the behavior detection unit 36 of the notification control apparatus 18 determines whether the detected person has started crossing. When it is detected in step S17 that the detected person has started crossing (Yes in step S17), the process proceeds to step S18. When it is not determined in step S17 that the detected person has started crossing (No in step S17), the process proceeds to step S20.

The case where it is not determined in step S17 that the detected person has started crossing the road may include a case where the behavior detection unit 36 detects that the detected person has made a gesture such as shaking the head or waving to indicate that the detected person does not intend to cross the road.

In step S18, the behavior detection unit 36 of the notification control apparatus 18 determines whether the detected person has completed the crossing. When it is determined in step S18 that the detected person has completed the crossing (Yes in step S18), the process proceeds to step S19. When it is not determined in step S18, that the detected person has crossed the road (No in step S18), the process returns to step S18. In this case, the automatic driving control apparatus 14 continues to decelerate or stop until the detected person has crossed the road.

In step S19, the automatic driving control apparatus 14 accelerates or starts driving the vehicle 10. The automatic driving control apparatus 14 terminates the automatic driving of the vehicle 10 in response to the driver's termination instruction or termination operation to terminate automatic driving (Yes in step S20). In the absence of a termination instruction or termination operation to terminate automatic driving (No in step S20), automatic driving of the vehicle 10 is continued, and the process returns to step S12.

Figure 5:
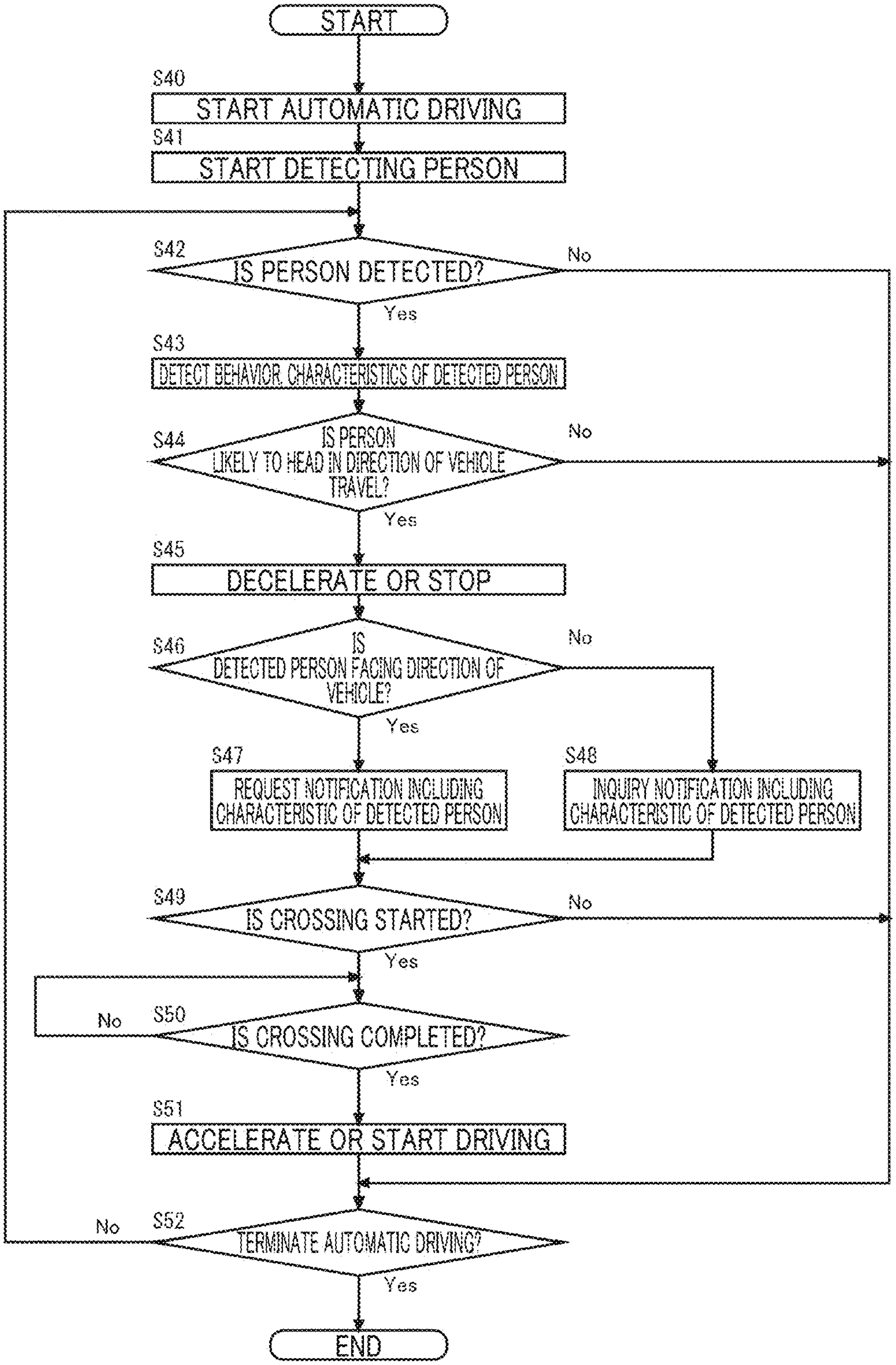
FIG. 5 is a flowchart showing another exemplary operation of the vehicle of the first embodiment.

FIG. 5 is a flowchart showing another exemplary operation of the vehicle 10 of the first embodiment. The processes of steps S40 to S45 and steps S49 to S52 in the flowchart shown in FIG. 5 are the same as the processes of steps S10 to S15 and steps 17 to S20 in the flowchart shown in FIG. 4 so that a description thereof is omitted. The process shown in FIG. 5 is a process including a determination of the "gaze at vehicle" column in FIG. 3, and the "sound volume" and "detail of call" are associated with the determination on the "gaze at vehicle".

After the vehicle 10 slows down or stops in step S45, the person orientation determination unit 40 determines whether the detected person faces the direction of the vehicle 10 (step S46). When it is determined in step S46, that the detected person faces the direction of the vehicle 10 (Yes in step S46), the process proceeds to step S47. When it is not determined in step S46, that the detected person faces the direction of the vehicle 10 (No in step S46), the process proceeds to step S48.

In step S47, the notification control unit 44 outputs a request notification including the characteristic of the detected person by using the directional speaker 20 and proceeds to step S49. Given that the characteristic of the detected person is "adult", and the color of the clothes is "red", the request notification in this case including the characteristic of the detected person is, for example, a notification such as "Attention. The individual in red clothes there, please cross the road" as shown in FIG. 3. In this case, the notification sound volume may be "low" because the detected person is facing the direction of the vehicle.

In step S48, the notification control unit 44 outputs an inquiry notification including the characteristic of the detected person by using the directional speaker 20 and proceeds to step S49. Given that the characteristic of the detected person is "adult", and the color of the clothes is "red", the inquiry notification in this case including the characteristic of the detected person is, for example, a notification such as "Attention. This is an automatically driven car. The individual in red clothes there, do you want to cross the road?" as shown in FIG. 3. In this case, the notification sound volume may be "medium" to let the detected person notice because the detected person is not facing the direction of the vehicle 10. That is, the notification sound volume may be larger when the detected person is not facing the direction of the vehicle than when the detected person is facing the direction of the vehicle.

Given that a plurality of persons are detected, the processes shown in FIGS. 4 and 5 are executed in parallel for the plurality of detected persons.

The notification control apparatus 18 of the first embodiment recognizes the characteristic of a person around the vehicle 10 and outputs a notification that covers the characteristic of the person. This causes a person around the vehicle 10 (in particular, a person attempting to cross the planned route of the vehicle 10 in the first embodiment) to recognize that the vehicle 10 recognizes the person and is attempting to communicate with the person, allowing him or her to pass near the vehicle 10 (cross the road in front of the vehicle 10, etc.) with a sense of security.

Further, the notification control apparatus 18 of the first embodiment changes the detail of notification that covers the characteristic of the person depending on whether the person around the vehicle 10 is facing the direction of the vehicle 10. For example, appropriate communication with the person around the vehicle 10 can be realized by selectively using a request-like expression or an inquiry-like expression for the person around the vehicle 10.

Second Embodiment

In the second embodiment, a technology for calling out to a pedestrian alongside a vehicle when the vehicle overtakes the pedestrian alongside the vehicle is proposed. In the second embodiment, the difference from the first embodiment will be mainly described, and a description of common features will be omitted. The feature of the second embodiment can of course be combined as desired with the feature of the first embodiment and the feature of a variation.

The configuration of the vehicle 10 of the second embodiment is the same as the configuration of the vehicle 10 of the first embodiment shown in FIG. 1. Further, the function block included in the notification control apparatus 18 of the second embodiment is the same as the function block provided in the notification control apparatus 18 of the first embodiment shown in FIG. 2.

FIG. 6 shows an example of the call rule stored in the call rule storage unit 42 of the notification control apparatus 18 in the second embodiment. The call rule of the second embodiment differs from the call rule of the first embodiment in respect of the detail of notification shown in the "detail of call" column.

In the second embodiment, the notification control unit 44 outputs a notification that uses an expression for calling attention of the detected person when the face orientation or gaze direction of the detected person is aligned with the direction of the vehicle 10. When the face orientation or gaze direction of the detected person is not aligned with the direction of the vehicle 10, on the other hand, the notification control unit 44 outputs a notification that uses an expression indicating an approach to the detected person.

Expressions for calling attention of the detected person are, for example, "Please be careful of an automatically driven car", "An automatically driven car is passing" directed at the person looking at the vehicle 10 alongside the vehicle 10. Since the detected person knows in advance that the vehicle 10 is approaching from behind, the expression for calling attention of the detected person is suitably an expression for calling attention as the vehicle 10 overtakes the detected person. On the other hand, the notification indicating an approach to the detected person is, for example, an expression "An automatically driven car is approaching" for a person who is alongside the vehicle 10 without looking at the vehicle 10. Since the detected person does not know in advance that the vehicle 10 is approaching from behind, the expression indicating an approach to the detected person suitably notifies that the vehicle 10 is approaching before the vehicle 10 overtakes the detected person.

Figure 7:
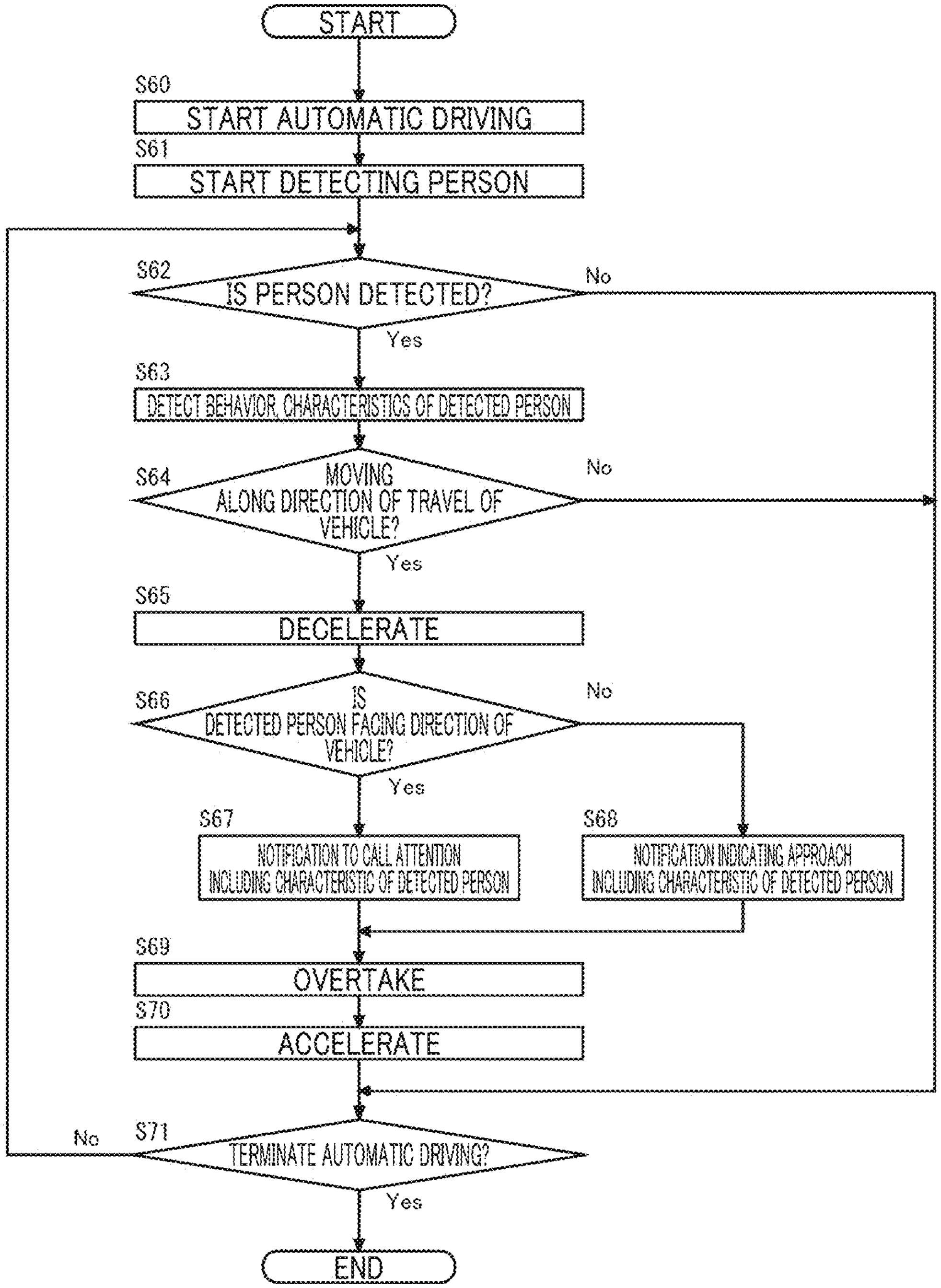
FIG. 7 is a flowchart showing an exemplary operation of the vehicle of the second embodiment.

FIG. 7 is a flowchart showing an exemplary operation of the vehicle 10 of the second embodiment. The processes of steps S60 to S63 and step S71 in the flowchart shown in FIG. 7 are the same as the processes of steps S10 to S13 and step S20 shown in FIG. 4 so that a description thereof is omitted.

In step S64, the behavior detection unit 36 of the notification control apparatus 18 determines whether an action that requires notification from the vehicle 10 to the detected person is detected and, specifically, whether the detected person is moving in the same direction of travel as the vehicle 10 along the planned route of the vehicle 10, i.e., whether the detected person is alongside the vehicle 10. The detected person in this case is a pedestrian walking on a road without a sidewalk, a person riding a bicycle on a road, etc. When it is determined in step S64 that the detected person is moving in the same direction of travel as the vehicle 10 along the planned route of the vehicle 10 (Yes in step S64), the process proceeds to step S65. When it is not determined in step S64 that the detected person is moving in the same direction of travel as the vehicle 10 along the planned route of the vehicle 10 (No in step S64), the process proceeds to step S71.

In step S65, the automatic driving control apparatus 14 slows down the vehicle 10 (step S65) and proceeds to step S66. In this case, the vehicle 10 is decelerated to a degree that it does not overtake the detected person.

In step S65, after the vehicle 10 decelerates, the person orientation determination unit 40 determines whether the detected person is facing the direction of the vehicle (step S66). When it is determined in step S66 that the detected person is facing the direction of the vehicle (Yes in step S66), the process proceeds to step S67. When it is not determined in step S66 that the detected person is facing the direction of the vehicle (No in step S66), the process proceeds to step S68.

In step S67, the notification control unit 44 outputs a notification to call attention including the characteristic of the detected person by using the directional speaker 20 and proceeds to step S69. Given that the characteristic of the detected person is "adult", and the color of the clothes is "red", the notification to call attention in this case including the characteristic of the detected person is, for example, a notification such as "Attention. The individual in red clothes there, an automatically driven car is passing on your right side." as shown in FIG. 6. In this case, the notification sound volume may be "low" because the detected person is facing the direction of the vehicle.

In step S68, the notification control unit 44 outputs a notification indicating an approach and including the characteristic of the detected person by using the directional speaker 20 and proceeds to step S69. Given that the characteristic of the detected person is "adult", and the color of the clothes is "red", the notification indicating an approach in this case including the characteristic of the detected person is, for example, a notification such as "Attention. The individual in red clothes there, please be careful of an automatically driven car approaching and passing on your right side" as shown in FIG. 6. In this case, the notification sound volume may be "medium" to let the detected person notice because the detected person is not facing the direction of the vehicle 10.

When the vehicle 10 runs on a road such as a shopping street where there are many pedestrians, the vehicle 10 may output a call sound directed at each of a plurality of detected persons moving in the same direction as the vehicle 10 along the planned route of the vehicle 10 and suited to the characteristic and gaze direction of each detected person.

In step S69, the automatic driving control apparatus 14 controls the running of the vehicle 10 to overtake the person alongside the vehicle at a slow speed. In this process, the lateral distance to the person alongside is kept being proper. When a certain distance is created from the person alongside after the process of step S69, the automatic driving control apparatus 14 starts acceleration and returns to automatic driving at a normal speed.

The notification control apparatus 18 of the second embodiment recognizes the characteristic of the person around the vehicle 10 and outputs a notification that covers the characteristic of the person in the same manner as the notification control apparatus 18 of the first embodiment. This causes a person around the vehicle 10 (in particular, the person alongside the vehicle 10 in the second embodiment) to be aware that the vehicle 10 recognizes him or her and is attempting to communicate with him or her and to pass near the vehicle 10 (to be alongside the vehicle 10, etc.) with peace of mind.

The notification in the second embodiment may include the following detail instead of the detail of call described above. When it is determined that the detected person is facing the direction of the vehicle, the notification control unit 44 outputs a notification that uses an expression for calling attention of the detected person. When the face orientation or gaze direction of the detected person is not aligned with the direction of the vehicle 10, on the other hand, the notification control unit 44 outputs a notification that uses an expression indicating an advance notice to the detected person.

In this case, a notification to call attention including the characteristic of the detection person is output in step S67 shown in FIG. 7 by using the directional speaker 20, and an advance notice including the characteristic of the detection person is output in step S68 by using the directional speaker 20.

The expression for calling attention in this case is, for example, “Please be careful of an automatically driven car”, “An automatically driven car is passing”, “An automatically driven car is approaching” directed at the person looking at the vehicle 10 and alongside the vehicle 10. Since the detected person knows in advance that the vehicle 10 is approaching from behind, it is appropriate to notify the detected person with an expression for calling attention by outputting a notification indicating that the vehicle 10 is dangerous or a notification indicating what kind of condition the vehicle 10 is in.

Further, the expression indicating an advance notice in this case is, for example, an expression “An automatically driven car is passing on your right side”, “Mind a narrowing distance from an automatically driven car” directed at a person who is alongside the vehicle 10 without looking at the vehicle 10. Since the detected person may not be visually identifying the vehicle 10 approaching from behind, it is appropriate to notify the person in advance of a dangerous state assumed as the vehicle approaches before the vehicle overtakes the detected person.

Given above is a description of the present disclosure based on the first and second embodiments. The detail described in each embodiment is intended to be illustrative only and it will be understood by those skilled in the art that various modifications to combinations of constituting elements and processes of the embodiment are possible and that such modifications are also within the scope of the present disclosure.

The first variation applicable to both the first and second embodiments will be described. Given that there are, within a predetermined range around a person (referred to as the “first detected person”) determined by the behavior detection unit 36 to be likely to head in the direction of travel of the vehicle 10, a plurality of further persons (referred to as the “second detected person”), the notification control unit 44 of the notification control apparatus 18 may output a notification including the characteristic of the first detected person to the first detected person. One second detected person or a plurality of second detected persons may be identified. The predetermined range may be a range of 2 to 3 meters around the first detected person as seen from the vehicle 10 (in other words, from the shooting position). The notification control unit 44 may determine the presence or absence of the second detected located within the predetermined range around the first detected person by referring to the lateral viewing angle of the imaging apparatus 12.

According to the first variation, it is possible, even in the presence of the second detected person near the first detected person who should be notified, to cause the first detected person to recognize that he or she is the one who is being notified, by outputting a notification including the characteristic of the first detected person. This also makes it difficult for the second detected person, who should not be notified, to mistakenly recognize that he or she is being notified.

The second variation applicable to both the first and second embodiments will be described. Given that there is, within a predetermined range around a person (referred to as the “first detected person”) determined by the behavior detection unit 36 to be likely to head in the direction of travel of the vehicle 10, a further person having a similar characteristic as the first detected person (referred to as the “second detected person”), the notification control unit 44 of the notification control apparatus 18 outputs a notification including the characteristic of the first detected person to the first detected person. One second detected person or a plurality of second detected persons may be identified. The predetermined range may be a range of 2 to 3 meters around the first detected person as seen from the vehicle 10 (in other words, from the shooting position).

The characteristic of the first detected person included in the notification in the second variation is a characteristic subgeneric to the characteristic common to the first detected person and the second detected person. As already described in part in the embodiments, the characteristic extraction unit 38 may, given that the second detected person having a similar characteristic as the first detected person is located within the predetermined range around the first detected person, extract a characteristic capable of identifying the first detected person, i.e., a characteristic capable of distinction from the second detected person, based on the captured image. When both the first detected person and the second detected person are wearing a hat, for example, the shape, pattern, or color of the hat may be further detected as characteristic of the first detected person. The notification control unit 44 may determine a notification including the detail of call “The individual wearing a black hat” instead of a simple notification “The individual wearing a hat” as the notification including the characteristic of the first detected person.

According to the second variation, it is possible, even in the presence of the second detected person having a similar characteristic near the first detected person who should be notified, to cause the first detected person to recognize that he or she is the one who is being notified, by outputting a notification including the characteristic of the first detected person capable of distinction from the second detected person. This also makes it difficult for the second detected person, who should not be notified, to mistakenly recognize that he or she is being notified.

The third variation applicable to both the first and second embodiments will be described. In the first and second embodiments, the notification to the detected person is implemented by audio output from the directional speaker 20 of the vehicle 10. In one variation, the vehicle 10 may include a display unit capable of displaying various information and may include a plurality of display units facing different directions. The notification control unit 44 of the notification control apparatus 18 may display information (text, image, etc.) showing the detail of call defined by the call rule on the display unit of the plurality of display units that faces the direction of the detected person, thereby providing the detail of call to the detected person.

The fourth variation applicable to both the first and second embodiments will be described. The functions provided in the notification control apparatus 18 in the first and second embodiments may be distributed and implemented in a plurality of apparatuses, and the plurality of apparatuses may communicate and cooperate as a system to exhibit the same functionality as the notification control apparatus 18 of the first and second embodiments. For example, some of the functions provided in the notification control apparatus 18 in the first and second embodiments may be implemented in a server on a cloud. In this case, the notification control apparatus of the vehicle 10 may exhibit the same functionality as the notification control apparatus 18 of the first and second embodiments by communicating and cooperating with the server on the cloud.

Any combination of the embodiment and the variation described above will also be useful as an embodiment of the present disclosure. New embodiments created by the combination provide the advantages of embodiment and the variation combined. It will also be understood by skilled persons that the functions that the constituting elements recited in the claims should achieve are implemented either alone or in combination by the constituting elements shown in the embodiment and the variations.

What is claimed is:

1. A notification control apparatus for a vehicle, comprising a memory storing executable instructions that, in response to execution, cause a processor to perform operations via units, comprising:

a person detection unit that detects, based on an image capturing a scene outside a vehicle, a person in a vicinity of the vehicle;

a behavior detection unit that detects a behavior of the person detected by the person detection unit; and a notification control unit that outputs, when it is determined based on the behavior of the person detected by the behavior detection unit that it is necessary to notify the person from the vehicle, a notification to the person; and a characteristic extraction unit that extracts a characteristic of the person detected by the person detection unit;

wherein, in response to another person having a characteristic of a similar appearance to the person and is within a predetermined range around the person determined by the behavior detection unit as requiring a notification from the vehicle, the notification control unit outputs via a speaker a notification including a subgeneric characteristic capable of identifying the person toward the person.

2. The notification control apparatus according to claim 1, further comprising:

a person orientation determination unit that detects a face orientation or gaze direction of the person detected by the person detection unit and determines whether the face orientation or gaze direction of the person detected is aligned with a direction of the vehicle, wherein the notification control unit outputs different notifications to the person when the face orientation or gaze direction of the person is aligned with the direction of the vehicle and when the face orientation or gaze direction of the person is not aligned with the direction of the vehicle.

3. The notification control apparatus according to claim 2, wherein the notification control unit outputs a notification that uses an expression indicating a request when the face orientation or gaze direction of the person is aligned with the direction of the vehicle and outputs a notification that uses an expression indicating an inquiry when the face orientation or gaze direction of the person is not aligned with the direction of the vehicle.

4. The notification control apparatus according to claim 2, wherein the notification control unit outputs a notification that uses an expression for calling attention when the face orientation or gaze direction of the person is aligned with the direction of the vehicle and outputs a notification that uses an expression indicating an advance notice when the face orientation or gaze direction of the person is not aligned with the direction of the vehicle.

5. The notification control apparatus according to claim 1, wherein the notification control unit determines, when the person is likely to head in a direction of travel of the vehicle, that it is necessary to notify the person from the vehicle.

6. The notification control apparatus according to claim 5, wherein the notification control unit determines, when the behavior detection unit detects that the person is stationary and is likely to head in the direction of travel of the vehicle, that it is necessary to notify the person from the vehicle.

7. The notification control apparatus according to claim 1, further comprising:

wherein the notification control unit causes the vehicle to decelerate when the person is likely to head in a direction of travel of the vehicle.

8. The notification control apparatus according to claim 1, further comprising:

wherein the notification control unit causes the vehicle to decelerate when the behavior detection unit detects that the person is stationary and is likely to head in the direction of travel of the vehicle.

9. The notification control apparatus according to claim 1, further comprising:

wherein the notification control unit causes an automatic driving control apparatus to decelerate the vehicle when the person is likely to head in a direction of travel of the vehicle.

10. The notification control apparatus according to claim 1, further comprising:

wherein the notification control unit causes an automatic driving control apparatus to decelerate the vehicle when the behavior detection unit detects that the person is stationary and is likely to head in the direction of travel of the vehicle.

11. A computer-executable notification control method for a vehicle, comprising a memory storing executable instructions that, in response to execution, cause a processor to perform operations via units, comprising:

detecting, by a person detecting unit, based on an image capturing a scene outside a vehicle, a person in a vicinity of the vehicle;

detecting, by a behavior detection unit, a behavior of the person detected by the person detection unit;

outputting, by a notification control unit, when it is determined based on the behavior of the person detected by the detecting of a behavior that it is necessary to notify the person from the vehicle, a notification to the person; and extracting, by a characteristic extraction unit, a characteristic of the person detected by the person detection unit;

wherein, in response to another person having a characteristic of a similar appearance to the person and is within a predetermined range around the person determined by the behavior detection unit as requiring a notification from the vehicle, outputting, by the notification control unit, via a speaker, a notification including a subgeneric characteristic capable of identifying the person toward the person.

* * * * *